United States Patent [19]
Foster

[11] Patent Number: 6,026,494
[45] Date of Patent: Feb. 15, 2000

[54] ALGORITHM TO REDUCE POWER CONSUMPTION OF AN AUTO-NEGOTIATING ETHERNET TRANSCEIVER

[75] Inventor: Jay Arnold Foster, Austin, Tex.

[73] Assignee: Xircom, Inc., Thousand Oaks, Calif.

[21] Appl. No.: 09/063,977

[22] Filed: Apr. 21, 1998

[51] Int. Cl.$^7$ ..................................................... G06F 1/32

[52] U.S. Cl. ......................... 713/320; 713/300; 713/324; 713/340

[58] Field of Search .................................... 713/320, 300, 713/310, 322, 323, 340; 710/46, 109; 709/227, 228, 224

[56] References Cited

U.S. PATENT DOCUMENTS

| | | | |
|---|---|---|---|
| 5,404,544 | 4/1995 | Crayford | 713/300 |
| 5,408,423 | 4/1995 | Kawagishi | 364/707 |
| 5,426,775 | 6/1995 | Baccon-Gibod | 395/575 |
| 5,432,775 | 7/1995 | Crayford | 370/10 |
| 5,448,756 | 9/1995 | DeLuca et al. | 455/38.3 |
| 5,625,349 | 4/1997 | Disbrow et al. | 340/825.31 |
| 5,659,761 | 8/1997 | DeArras et al. | 713/300 |
| 5,754,552 | 5/1998 | Allmond et al. | 370/465 |
| 5,806,007 | 9/1998 | Raith et al. | 455/574 |
| 5,832,283 | 11/1998 | Chou et al. | 713/300 |
| 5,883,894 | 3/1999 | Patel et al. | 370/438 |
| 5,884,041 | 3/1999 | Hurwitz | 709/228 |

OTHER PUBLICATIONS

Integrated Circuit Systems, Inc., ICS1890 Advance Information, 10Base–T/100Base–TX Integrated PHYceiver™.

*Primary Examiner*—Ayaz R. Sheikh
*Assistant Examiner*—Ario Etienne
*Attorney, Agent, or Firm*—Clayton, Howarth & Cannon, P.C.

[57] ABSTRACT

A method and apparatus for reducing power consumption of an auto-negotiating ethernet transceiver by enabling a driver for the transceiver to alternate between a typical higher-power energy consumption mode to a lower-power energy consumption mode when a network link is no longer detected by the transceiver. A new algorithm is included within the driver which is activated by the driver detecting the absence of the network link. The driver causes the portable computer to send instructions to the ethernet transceiver so that the transceiver continues to check for the network link. If the network link is not detected, the driver causes the ethernet transceiver to power down into a lower power consumption mode for a specific period of time. After the period of time has elapsed, the driver causes the ethernet transceiver to enter a normal higher power consumption mode during which the ethernet transceiver again checks for the network link. This process repeats itself until the portable computer is shut down or the network link is reestablished.

9 Claims, 10 Drawing Sheets

ALGORITHM TO REDUCE POWER CONSUMPTION OF AN AUTO-NEGOTIATING ETHERNET TRANSCEIVER

BACKGROUND

1. Field of the Invention

The present invention relates to a method and apparatus for reducing power consumption of an ethernet transceiver. More specifically, the present invention conserves power of a notebook computer by using an auto-negotiating ethernet transceiver which can detect when an ethernet link has been physically disconnected. The present invention then causes the ethernet transceiver to enter into a low power mode to reduce energy consumption until the physical connection of a network cable is reconnected.

2. The State of the Art

Ethernet transceivers are becoming more ubiquitous in portable computers as connections to local area networks (LANs), wide area networks (WANs), other Intranet configurations, and to the Internet are becoming necessary elements of doing business in an information age. The advantages of sharing information and resources by use of networks are realized by many computer users. It is also the case that many computer users prefer the mobility provided by portable computers also known as laptop, notebook and sub-notebook computers. However, it is only as use of portable computers has become more widespread that some of the problems inherent to the use of an ethernet (a type of computer network) transceiver with a portable computer has been recognized.

In particular, one problem that has manifest itself becomes an issue when a portable computer which is connected to a network is physically disconnected without terminating the network session. In other words, the problem arises when a connection to a network is severed by physically removing a network connector such as an RJ-45, AUI, or BNC connector from an ethernet transceiver in the portable computer without first logging off the network. This situation typically arises when the computer user needs to move the portable computer to a new location, such as to a different office, and does not take the time to log off of the computer network.

This situation occurs even when the computer users is aware of being connected to the computer network. However, the computer user is also probably aware that there is typically no danger to the portable computer by physically disconnecting a running computer from the network. Furthermore, as long as no file transfer is taking place between the portable computer and the network, there is no danger to the user's files on the network. Accordingly, there is no reason, which would be apparent to the computer user, why the network connection should not be removed so that the portable computer can be made portable for use elsewhere.

Nevertheless, there are consequences of moving the portable computer without terminating the network connection. To understand these consequences, it is necessary to realize facts which are also typical to the scenario described above. First, if the computer user is going to disconnect the network connection and move the portable computer, it is also likely that a power cord to the portable computer is going to be disconnected. Second, this means that the portable computer will continue to operate on internal battery power until the portable computer is either shut down (turned off), or reconnected to the power cord.

It is typically of primary concern to the computer user of a portable computer that the portable computer be able to continue operation on internal battery power as long as possible. This is because the portable computer is likely to be operating off internal battery power for an extended period of time. If this is the case, the computer user is now unaware that the internal battery power is being drained at a much faster rate than can be accounted for simply by operation of the portable computer. This is because, unknown to the computer user, the network transceiver which was physically disconnected from a network cable is disadvantageously continuing to operate in a high power consumption mode.

The principles of operation of an auto-negotiating ethernet transceiver which are of concern to the present invention will now be explained. The auto-negotiating aspect of the ethernet transceiver refers to an ability to "negotiate" a connection to a host computer which is responsible for network functions. This is accomplished by first detecting ethernet activity on network cabling. This is also referred to as detecting a link. When the link is detected, the ethernet transceiver then negotiates communication parameters with the host computer so that communication can take place. These communication parameters include determining the highest performance common operating mode at which the transceiver and the host computer can operate. For example, the transceiver can determine at what speed it can communicate with other network nodes.

When the computer user physically disconnects a network cable from the ethernet transceiver, the ethernet transceiver continues to check for an ethernet link. When none is detected, the ethernet transceiver continues to check for the link approximately every two seconds. Checking for an ethernet link is an operation that is a high power draw. Accordingly, the internal battery is drained much faster than if the transceiver were not continuing to check for the link.

Therefore, it would be advantageous over the prior art to provide a method and apparatus for lowering the power drain on the internal battery of a portable computer whenever a link to a network is physically disconnected from an auto-negotiating transceiver. It would also be advantageous if the network transceiver could continue to auto-negotiate a connection to the network so that if the physical connection is reestablished, the portable computer could continue to communicate with the network.

OBJECTS AND SUMMARY OF THE INVENTION

It is an object of the present invention to provide a method and apparatus for reducing power consumption of an auto-negotiating network transceiver.

It is another object to provide a method and apparatus for reducing power consumption of the auto-negotiating transceiver by providing a driver for the network transceiver which gives the network transceiver the ability to change its mode of operation when the network link is not detected.

It is another object to provide a method and apparatus for reducing power consumption of the auto-negotiating network transceiver by providing a low power mode of operation when the network link is not detected.

It is another object to provide a method and apparatus for reducing power consumption of the auto-negotiating network transceiver by alternating between the low power mode of operation and the normal high power mode of operation until the network link is detected.

It is another object to provide a method and apparatus for reducing power consumption of a portable computer operating off of an internal battery supply by reducing the power consumption of the auto-negotiating network transceiver.

The present invention is embodied in a method and apparatus for reducing power consumption of an auto-negotiating ethernet transceiver by enabling a driver for the transceiver to alternate between a typical higher-power energy consumption mode and to a lower-power energy consumption mode when a network link is no longer detected by the transceiver. This is accomplished by including within the driver a new algorithm which is activated by detecting the absence of the network link. The driver causes the portable computer to send instructions to the ethernet transceiver which causes it to continue to check for the network link. If the network link is not detected, the driver causes the ethernet transceiver to power down into a lower power consumption mode for a specific period of time. After the period of time has elapsed, the driver causes the ethernet transceiver to enter a normal higher power consumption mode during which the ethernet transceiver again checks for the network link. This process repeats itself until the portable computer is shut down or the network link is reestablished.

In a first aspect of the invention, a software driver for the ethernet transceiver is modified with the new algorithm which is activated upon detection of the absence of the network link.

In a second aspect of the invention, the new algorithm returns the ethernet transceiver to a state of higher power consumption when the network link is reestablished.

In a third aspect of the invention, any driver for a network transceiver can be modified to include the new algorithm which provides for higher power and lower power consumption modes which are activated upon detection of the absence of a network link.

These and other objects, features, advantages and alternative aspects of the present invention will become apparent to those skilled in the art from a consideration of the following detailed description taken in combination with the accompanying drawings.

DETAILED DESCRIPTION OF THE INVENTION

Reference will now be made to the drawings in which the various elements of the present invention will be given numerical designations and in which the invention will be discussed so as to enable one skilled in the art to make and use the invention. It is to be understood that the following description is only exemplary of the principles of the present invention, and should not be viewed as narrowing the claims which follow.

Before beginning a description of the present invention, it is useful to understand that the present invention describes a method and apparatus for reducing power consumption of an ethernet transceiver. However, it should be realized from the outset that while the specific transceiver for which the algorithm of the present invention is designed to operate is designed for use with ethernet standards and protocols, the present invention is applicable to transceivers which can operate with other network standards and protocols. Therefore, while an ethernet transceiver will be described hereinafter, the principles of the present invention represent a broader scope of application.

Figure 1:
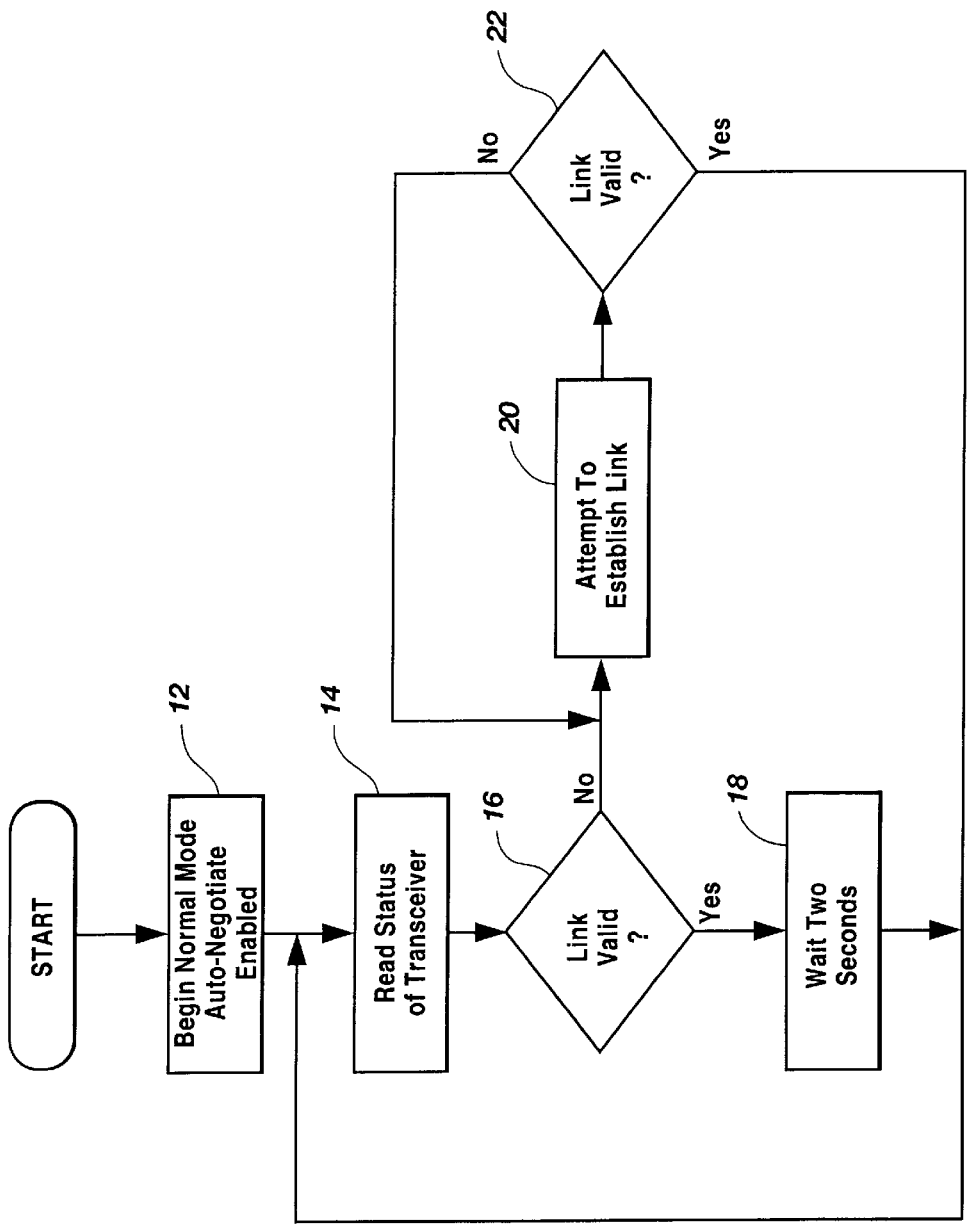
FIG. 1 is a flowchart illustrating the typical method of operation of a driver for an ethernet transceiver as it exists in the state of the art.

The present invention is an improvement over existing ethernet transceiver drivers. To understand the nature of the improvement, it is helpful to examine a flowchart of the state of the art operation of a driver for an ethernet transceiver, and then to examine what is changed in the flowchart and executed by the new algorithm. It should be remembered that FIG. 1 only describes one possible implementation of the driver. Other implementations are possible FIG. 1 is a functional flowchart 10 of a state of the art driver for an ethernet transceiver. This driver is typically implemented in software to control a hardware device. The first step 12 is to begin a normal mode of operation. This consists of enabling the auto-negotiate feature of the ethernet transceiver. The ethernet transceiver then automatically exchange's information about the portable computer's (also called the local node) communication capabilities with its remote link partner. After the information is exchanged, each of the ethernet transceivers (the local node's and the remote link node's) compares its capabilities to those of its partner, and then the highest performance operational mode is selected.

For example, if the ethernet transceivers are both capable of 100Base-TX physical layer services, the ethernet transceivers always try to communicate at nearly 100 Megabits per second (Mbps). However, if one of the ethernet transceivers is only capable of 10Base-T communication (10 Mbps), and the other is capable of 100Base-TX communication, then the ethernet transceivers will communicate at 10 Mbps.

Figure 2:
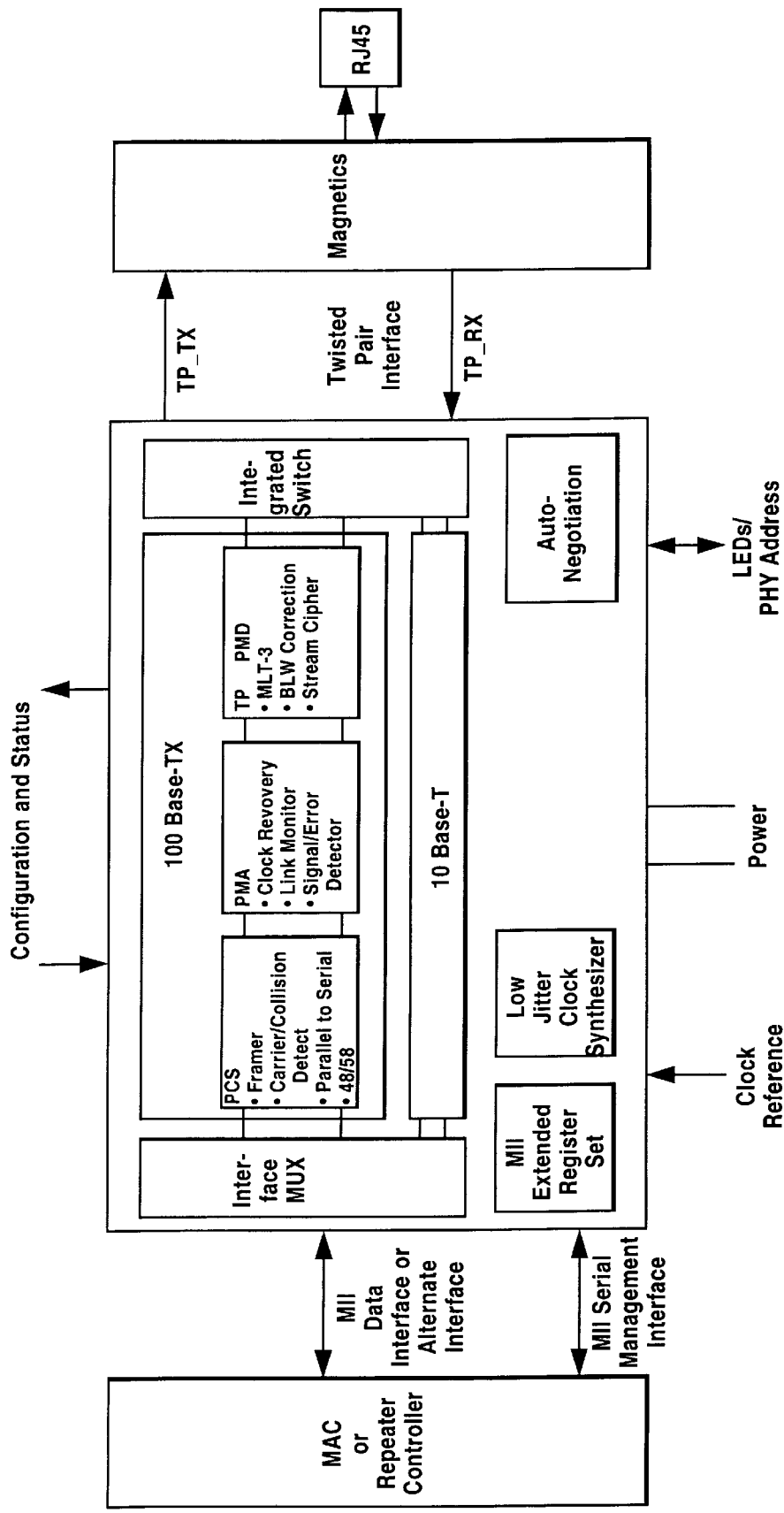
FIG. 2 is a block diagram of the ethernet transceiver which is used in the presently preferred embodiment of the present invention, as well as in state of the art applications.

The driver described above is capable of operation with, for example, an ethernet transceiver from Integrated Circuit Systems, Inc. having part number ICS1890. The ICS1890 is a fully integrated physical layer device supporting both 10 and 100 Mbps Ethernet applications, among other capabilities. The ethernet transceiver is also capable of both manual and auto-negotiation. While the present invention functions with this particular ethernet transceiver, it should be apparent that the principles of the presently preferred embodiment to be described can be adapted to any ethernet transceiver, and also to other transceivers using other standards and protocols. For convenience, a block diagram of the ethernet transceiver is provided as FIG. 2.

The next step 14 of FIG. 1 is to read the status of the ethernet transceiver. Reading the status consists of examining the contents of certain memory registers within the ethernet transceiver. These memory registers indicate, among other things, an operational mode or state of the ethernet transceiver.

From these memory registers, the driver executes the next step 16 of an algorithm to determine the integrity of a data link (or just "link") of the ethernet transceiver. If the link is valid, then the ethernet transceiver does not have to auto-negotiate the link with the remote node. The transceiver then waits for approximately two seconds in step 18 before returning to step 14 where the status of the ethernet transceiver is again read from its memory registers. As long as the link between the local node and the remote node remains valid, this process will repeat itself approximately every two seconds.

However, if the link is determined not to be valid in step 16, the driver then automatically attempts to reestablish the link through auto-negotiation in step 20. The driver then determines in step 22 whether or not the link has been reestablished. If it is, the driver then moves to step 14 where the status of the ethernet transceiver is determined once again. However, if the link is not reestablished, the driver executes step 20 which is the auto-negotiation process.

It is now evident from this flowchart in FIG. 1 that the driver never exits from the auto-negotiation process of steps 20 and 22 if the link is not reestablished. Disadvantageously, this ethernet transceiver is typical in that the auto-negotiation process occurs in a high power consumption mode. Operation in this mode will place a significant drain on a portable computer's internal battery, causing premature shut down of the portable computer.

Figure 3:
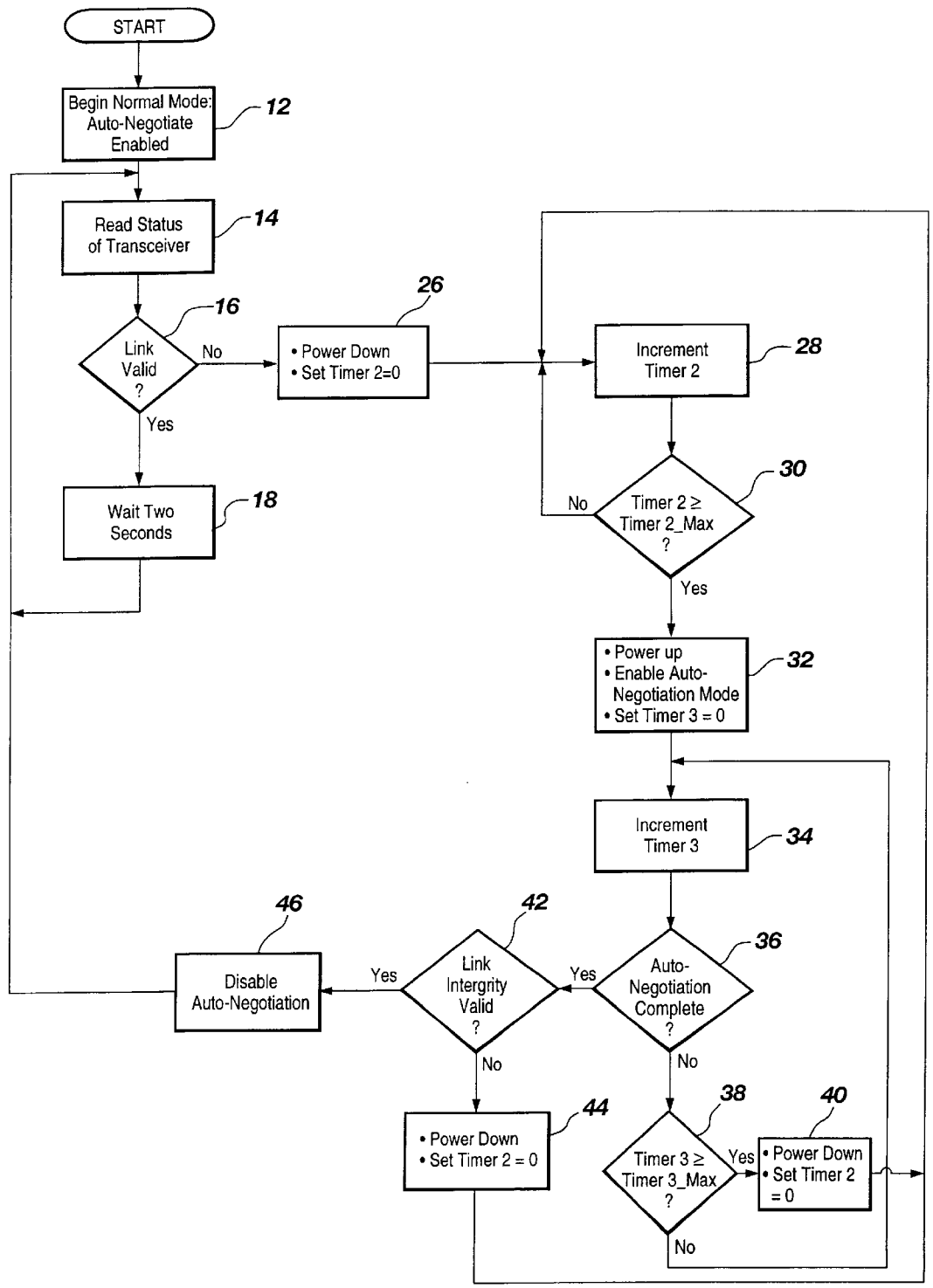
FIG. 3 is a flowchart illustrating the algorithm of the presently preferred method of operation of a new driver which is operating in accordance with the principles of the present invention.

FIG. 3 is a flowchart of the operation of the driver in the presently preferred embodiment. Not surprisingly, the driver begins with the same steps as in FIG. 1. Specifically, auto-negotiate is enabled in step 12, the status of the memory registers of the ethernet transceiver are read in step 14, and then the driver determines the integrity of the link in step 16. If the link integrity is valid, the driver proceeds to step 18 which is a wait state of approximately two seconds.

The new algorithm diverges from the state of the art when the link integrity is determined to be invalid in step 16. Instead of attempting to reestablish the link in step 20, the driver proceeds to step 26. In step 26, the driver powers down the ethernet transceiver, and sets a timer (TIMER2) to a value of zero.

The next step 28 results in TIMER2 being incremented. In the presently preferred embodiment, TIMER2 is incremented by a value of 2. The next step 30 is a decision block where the driver determines whether or not the value of TIMER2 is greater than or equal to a variable which has been set to a predetermined value. In the presently preferred embodiment, this variable is referred to as TIMER2_MAX. If TIMER2 is not greater than or equal to TIMER2_MAX, the algorithm moves back to step 28 and increments the value of TIMER2 again. This loop continues until TIMER2 meets the condition of step 30.

After the condition of step 30 is met, three processes occur. First, the ethernet transceiver is powered up. Then, the auto-negotiate mode is enabled on the ethernet transceiver. Finally, a new timer variable TIMER3 is set to a value of zero.

The next step is step 34 in which the value stored in TIMER3 is incremented. In the presently preferred embodiment, TIMER3 is incremented by two. After incrementing, the algorithm determines whether auto-negotiation is complete is step 36. If it in not complete, the algorithm determines if TIMER3 is greater than or equal to a predetermined variable TIMER3_MAX in step 38. If it is greater than or equal to, the algorithm executes step 40 in which the transceiver is powered down, and the variable TIMER2 is set equal to zero. The algorithm then proceeds to step 28.

It should be explained at this time that steps 28, 30, 32, 34, 36, 38 and 40 define a loop which keeps the ethernet transceiver in a low power consumption mode while the ethernet cable connection is not attached to the ethernet transceiver. This loop keeps repeating until the computer is either shut down, or the ethernet cabling (and the active ethernet network) is reconnected. To control how often this loop is repeated, the presently preferred embodiment makes TIMER2_MAX a value which results in the loop being repeated approximately once every 20 seconds.

If step 36 successfully auto-negotiates, the algorithm then moves to step 42 in which it is determined if link integrity is valid. If it is not valid, then step 44 causes the ethernet transceiver to power down, and TIMER2 to be set to zero. The algorithm then moves to step 28. Thus it should be recognized that the loop defined by steps 28, 30, 32, 34, 36, 42 and 44 also define a loop which keeps the ethernet transceiver in a low power consumption mode while the ethernet cable connection is not attached to the ethernet transceiver. Again, this loop keeps repeating until the computer is either shut down, or the ethernet cabling (and the active ethernet network) is reconnected. Of course, this assumes successful auto-negotiation in step 36.

However, if the link integrity is valid in step 42, the algorithm then disables auto-negotiation in step 46, and then moves to step 14 where the status of the transceiver is then checked approximately every two seconds. Step 18 of FIGS. 1 and 3 can thus be replaced by steps 48, 50 and 52 as follows.

Figure 4:
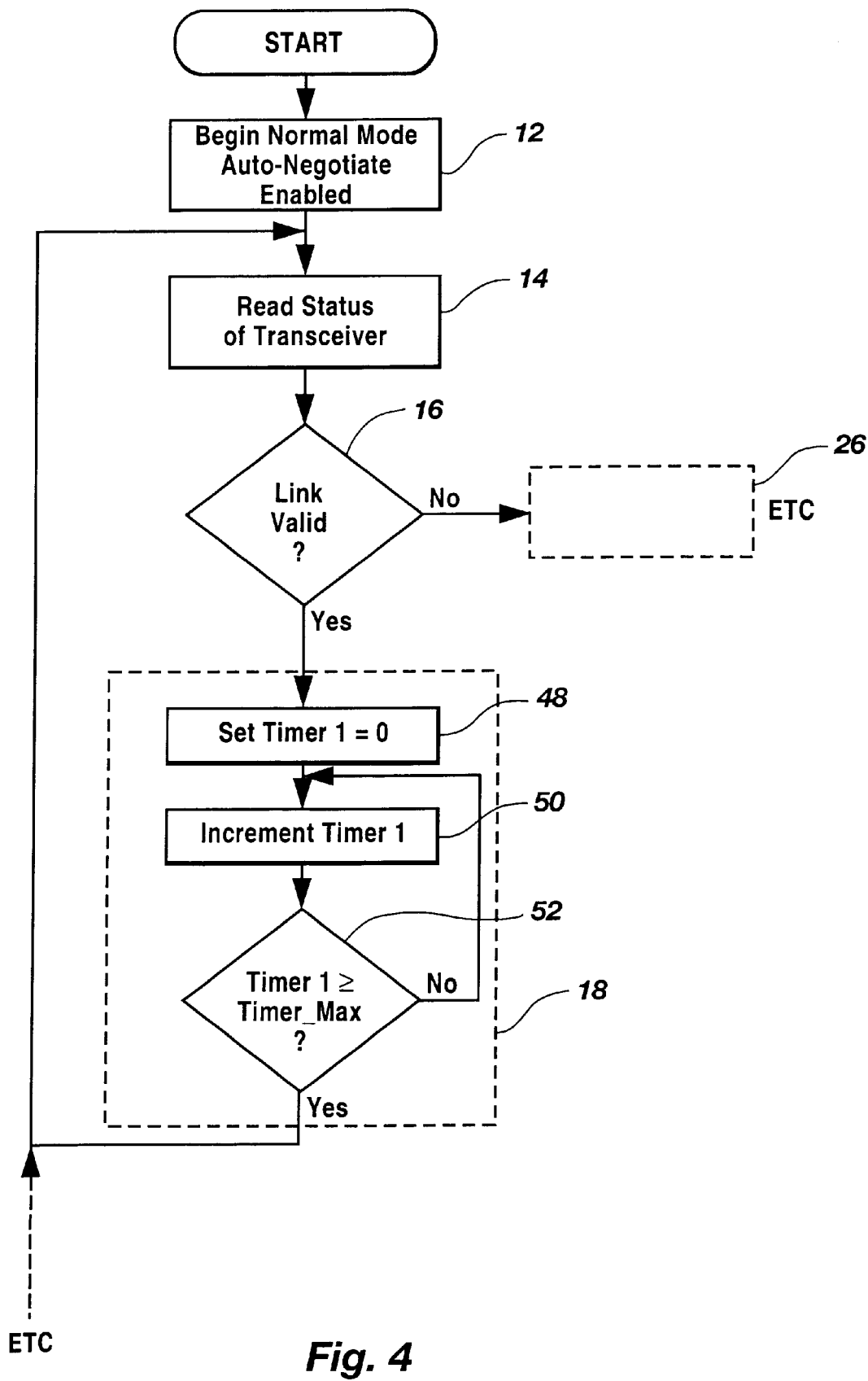
FIG. 4 is a flowchart illustrating more detailed aspects of step 18 shown in the presently preferred embodiment of FIG. 3.
Figure 5A:
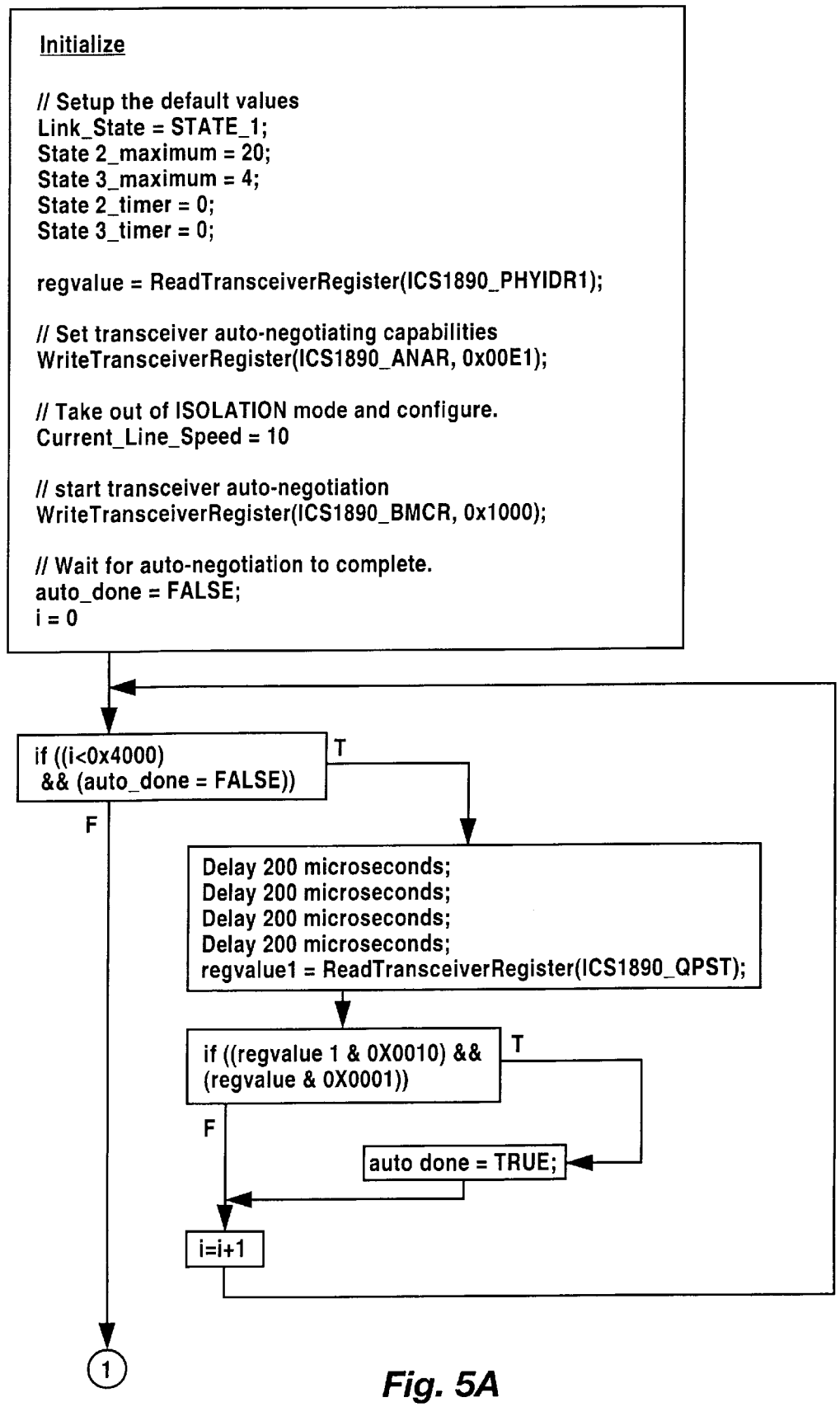
FIG. 5A is a first page of a flowchart/program showing the actual programming steps in C code, as well as how the registers of the CSI1890 ethernet transceiver are loaded.
Figure 5B:
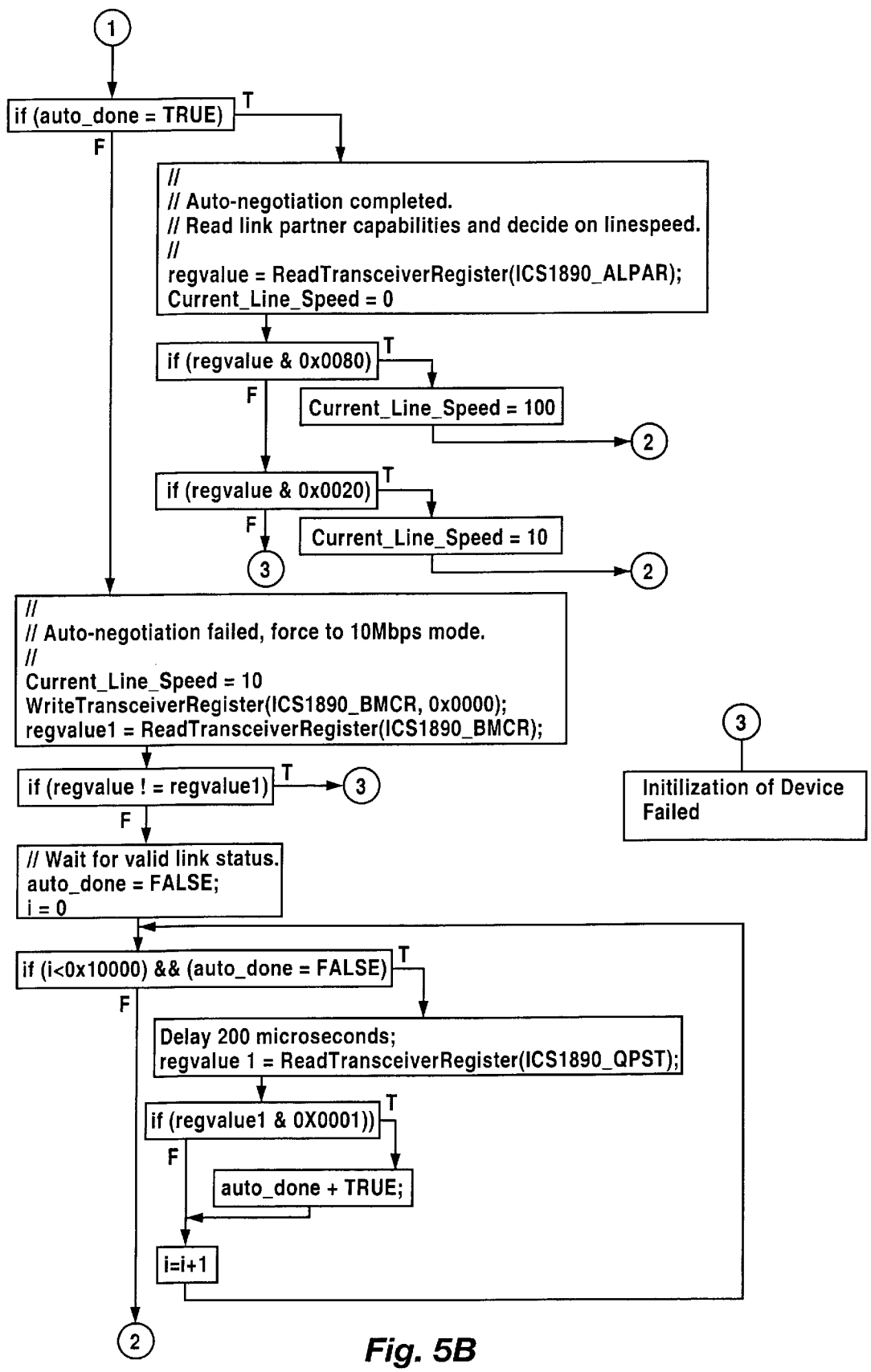
FIG. 5B is a continuation of a portion of the flowchart/program which began on FIG. 5A.
Figure 5C:
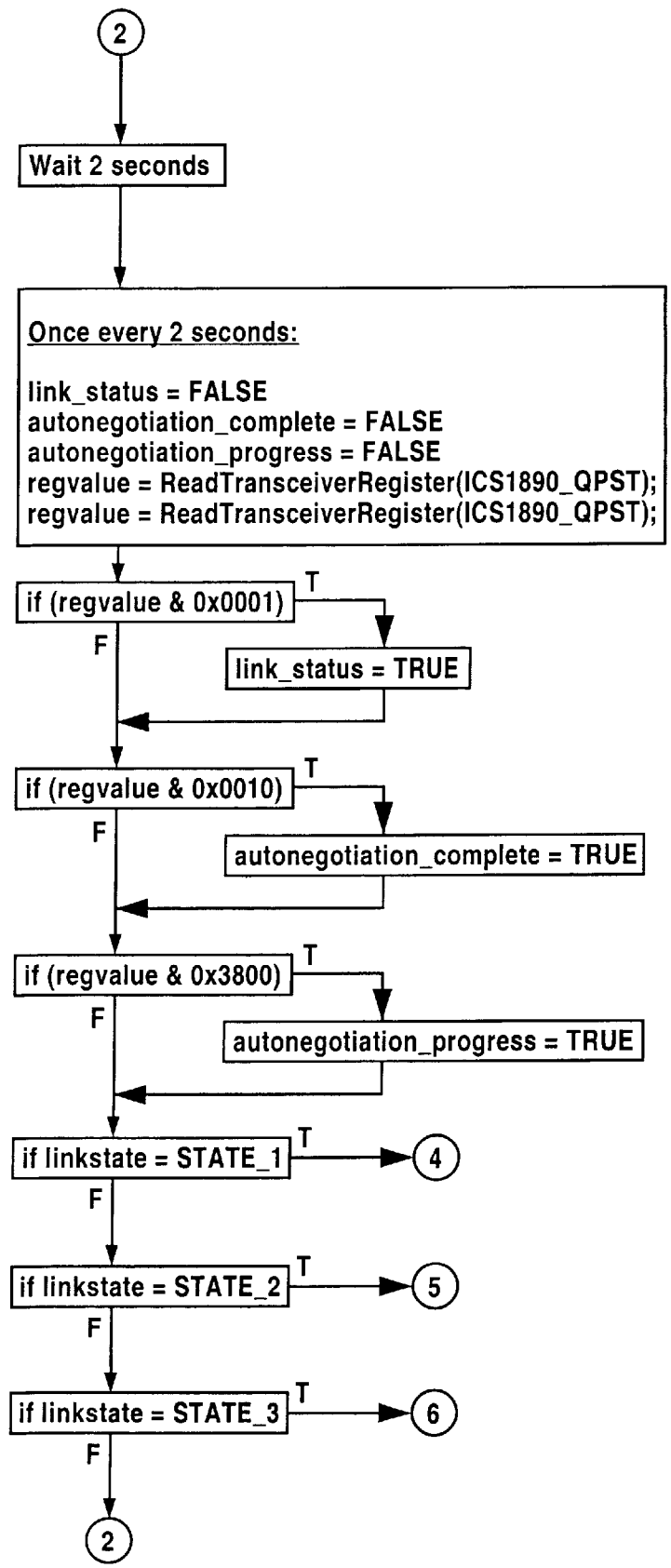
FIG. 5C is a continuation of a portion of the flowchart/program which began on FIG. 5A.
Figure 5D:
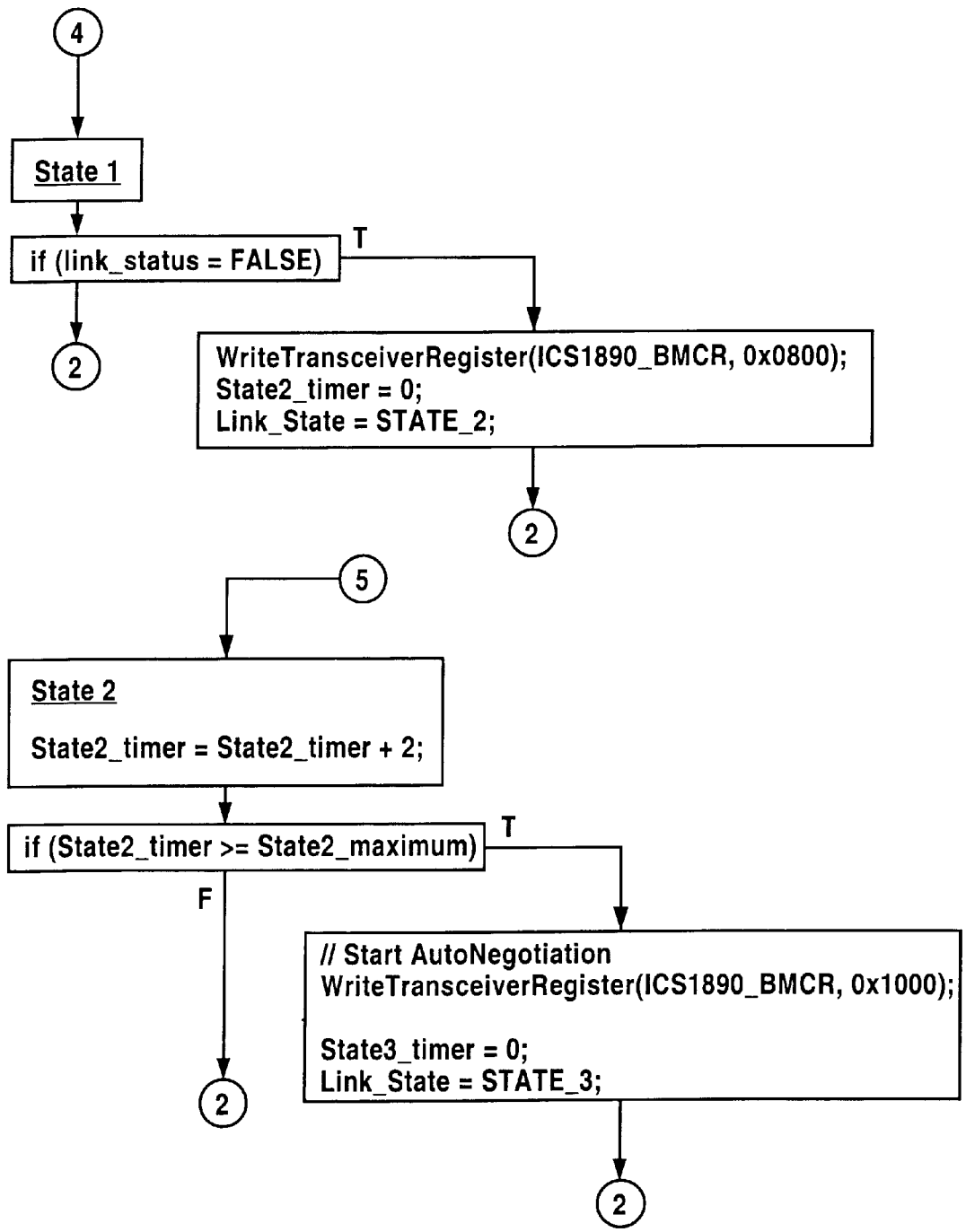
FIG. 5D is a continuation of a portion of the flowchart/program which began on FIG. 5A.
Figure 5E:
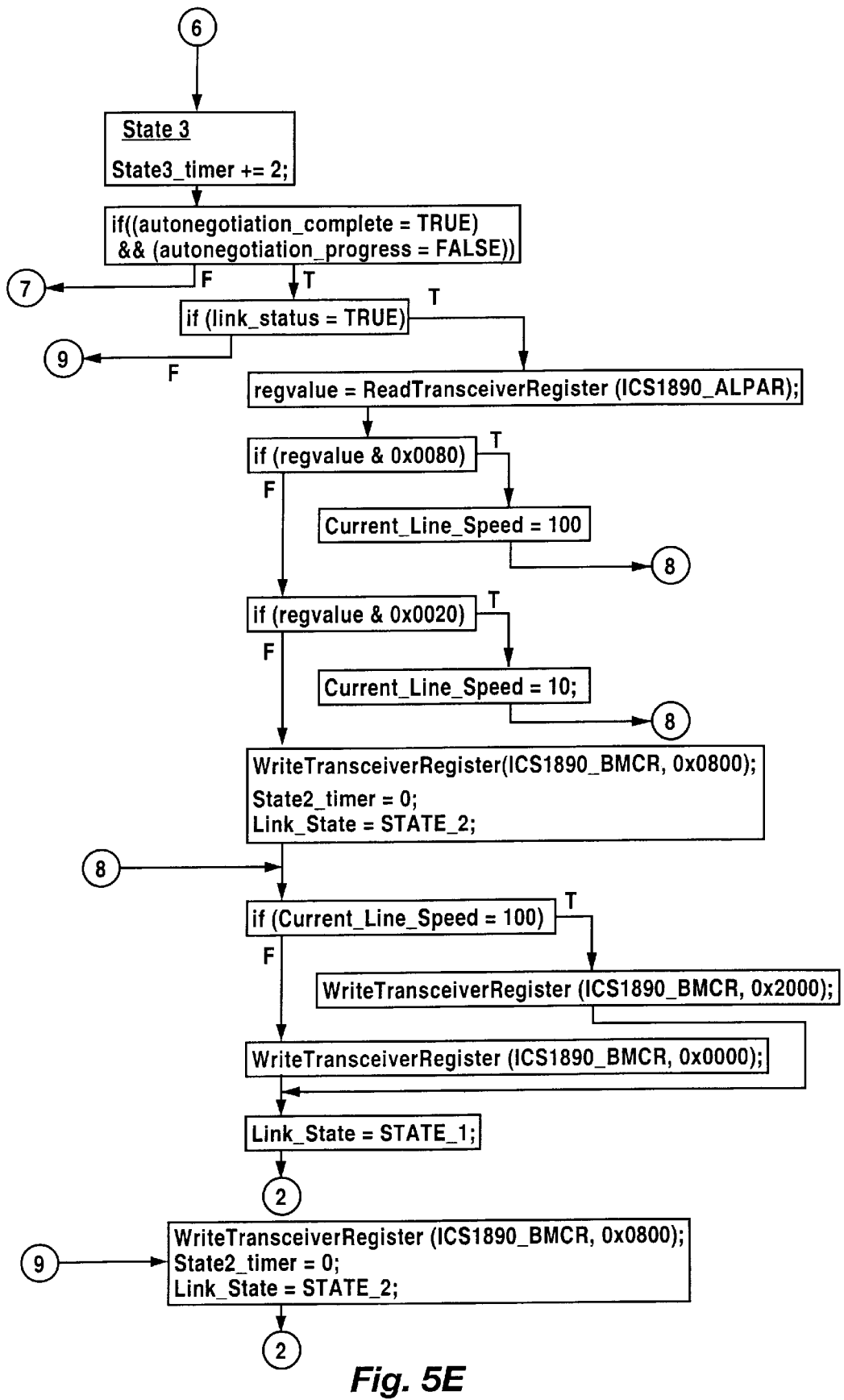
FIG. 5E is a continuation of a portion of the flowchart/program which began on FIG. 5A.
Figure 5F:
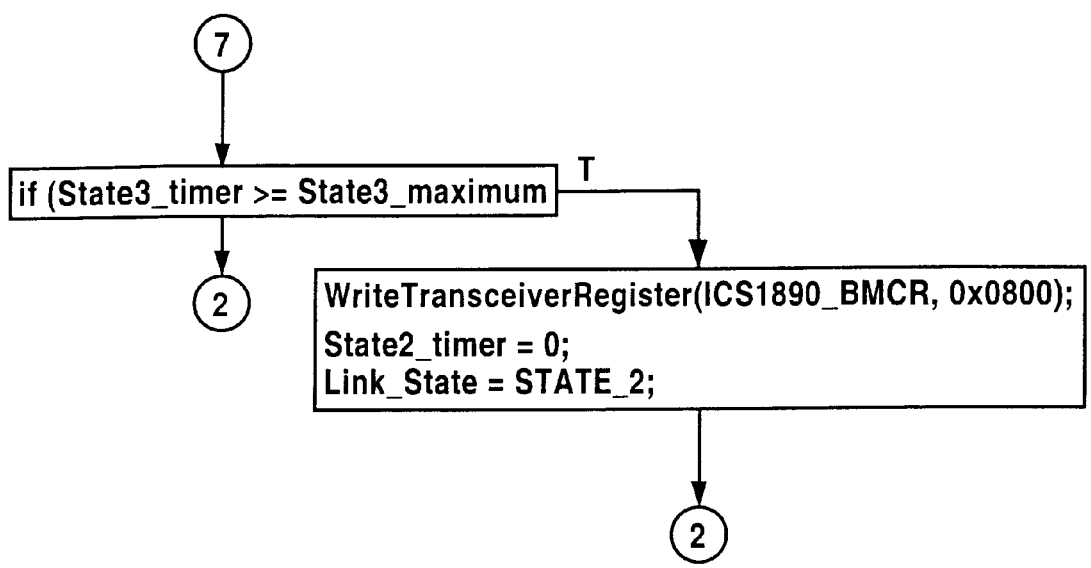
FIG. 5F is a continuation of a portion of the flowchart/program which began on FIG. 5A.

FIG. 4 shows that after determining that link integrity is invalid in step 16, the next new step is 48 where a timer counter TIMER1 is set to zero. Step 50 then increments the variable TIMER1. In the presently preferred embodiment, TIMER1 is incremented by a value of 2. Finally, the algorithm determines if TIMER1 is greater than or equal to a predetermined variable TIMER1_MAX. If not, the TIMER1 variable is incremented in step 50 until TIMER1 is greater than or equal to the variable TIMER1_MAX. When this condition of step 52 is met, the algorithm then loops back to step 14 as shown in FIG. 3.

While FIG. 3 is generally an overview of the presently preferred embodiment of the invention, it is noted that there is significant detail lacking from the algorithm. This detail is now provided in FIG. 5. Figure is a multi-page flowchart which provides specific details regarding the contents of memory registers within the ethernet transceiver as well as other useful information for implementation of the presently preferred embodiment.

FIGS. 5A, 5B, 5C, 5D, 5E, and 5F are shown as a flowchart, but it is also the actual program (with comments) executed by the software driver that is stored within the portable computer. This program is written in C code which, when executed, provides proper control signals from the portable computer to the ethernet transceiver. As a prelude to FIGS. 5A–5F, TABLE 1 is provided below which is used by the program to define the ethernet transceiver device registers of the ICS1890 chip. While FIGS. 5A–5F are adapted specifically for the ICS1890 ethernet transceiver, the program is modifiable by those skilled in the art so that it will operate as a driver for other network transceivers by following the same program format.

TABLE I

| define ICS1890_BMCR | 0 |
|---|---|
| define ICS1890_BMSR | 1 |
| define ICS1890_PHYIDR1 | 2 |
| define ICS1890_PHYIDR2 | 3 |
| define ICS1890_ANAR | 4 |
| define ICS1890_ALPAR | 5 |
| define ICS1890_ANER | 6 |
| define ICS1890_QPST | 17 |
| define ICS1890_DCR | 18 |
| define ICS1890_FCSCR | 19 |
| define ICS1890_RECR | 21 |
| define ICS1890_SRR | 22 |
| define ICS1890_PCR | 23 |
| define ICS1890_REG23 | 23 |
| define ICS1890_LBREMR | 24 |
| define ICS1890_REG24 | 24 |
| define ICS1890_PAR | 25 |
| define ICS1890_10BTSR | 27 |
| define ICS1890_10BTCR | 28 |

It is noted that FIGS. 5A–5F refer to states 1, 2 and 3. These "states" are the type which are referred to when discussing a state machine. A state machine representation of the presently preferred embodiment is also a valid method of showing algorithm logic. However, a flowchart was used in FIG. 3 to enhance comprehension of the overall flow of the embodiment. For purposes of clarity, it is noted that state 1 can defined in terms of FIG. 3 as including steps 14, 16 and 18. State 2 can be defined in terms of FIG. 3 as including steps 28 and 30. Finally, state 3 can be defined in terms of FIG. 3 as including steps 34, 36 and 38. These states essentially define loops which continue until a condition is met which causes the loop to terminate and the algorithm to proceed to a next state. It is also noted that instead of YES and NO responses for decision blocks as in FIG. 3, True (T) and False (F) responses are used in FIGS. 5A–5F.

It is to be understood that the above-described embodiments are only illustrative of the application of the principles of the present invention. Numerous modifications and alternative arrangements may be devised by those skilled in the art without departing from the spirit and scope of the present invention. The appended claims are intended to cover such modifications and arrangements.

What is claimed is:

1. A method for reducing power consumption of a network transceiver used in a portable computer, wherein the network transceiver is electrically and physically decoupled from a network connection of a network, said method comprising the steps of:

(1) polling to determine if a link between the network transceiver and the network connection is absent;

(2) entering a lower power consumption mode in the network transceiver for a selectable period of time when the link is absent;

(3) entering a higher power consumption mode in the network transceiver after the selectable period of time expires to thereby determine if the link has been reestablished; and (4) entering a normal operation mode in the network transceiver if the link is determined to be reestablished, and proceeding to step (2) and reentering the lower power consumption mode in the network transceiver if the link is not reestablished.

2. The method as defined in claim 1 wherein step (3) further comprises the step of auto-negotiating a link between the network transceiver and the network.

3. The method as defined in claim 1 wherein the method of using a network transceiver further comprises the step of using an ethernet transceiver which has auto-negotiating capabilities.

4. The method as defined in claim 1 wherein the method further comprises the steps of:

(1) polling for a link approximately every two seconds to determine if the link is absent; and (2) if the link is absent, remaining in the lower power consumption mode for approximately 20 seconds before again polling for the link.

5. The method as defined in claim 1 wherein step (2) further comprises the steps of:

(1) setting a first timer which maintains the ethernet transceiver in the lower power consumption mode for the selectable period of time;

(2) entering the higher power consumption mode to thereby determine if the link has been reestablished; and (3) auto-negotiating for a different selectable period of time.

6. The method as defined in claim 5 wherein the method further comprises the step of entering the lower power consumption mode of claim 5, step (1) if the different selectable period of time expires and the ethernet transceiver does not successfully auto-negotiate, and determining if the link is reestablished if the ethernet transceiver successfully auto-negotiates.

7. The method as defined in claim 6 wherein the method further comprises the step of entering the lower power consumption mode if the link is not reestablished, and proceeding to step (1) of claim 5.

8. The method as defined in claim 6 wherein the method further comprises the step of disabling auto-negotiation if the link is reestablished, and returning to step (1) of claim 1.

9. A system for reducing power consumption of a network transceiver used in aportable computer, wherein the network transceiver is electrically and physically decoupled from a network connection of a network, said system comprising:

the portable computer which has coupled thereto the network transceiver;

a network port of the network transceiver which receives the network connection;

a memory of the portable computer for storing executable programs; and a software driver for the network transceiver which is capable of causing the network transceiver to enter a lower power consumption mode when the software driver detects that the network connection is physically decoupled from the network transceiver.

* * * * *